April 8, 1958      R. L. KYHL      2,830,268
METHOD FOR MEASURING BEAM CURRENT
Filed April 29, 1955
FIG-1
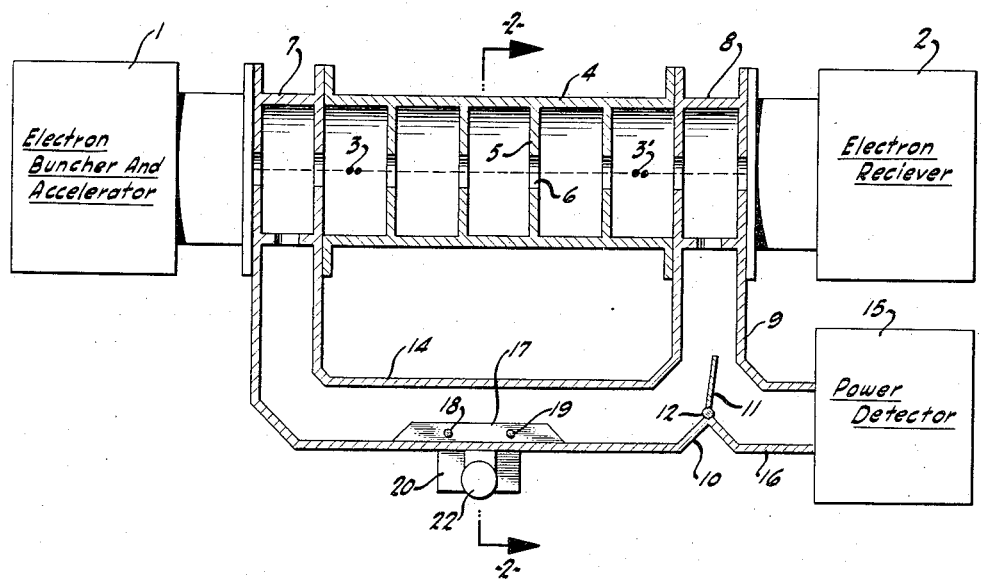
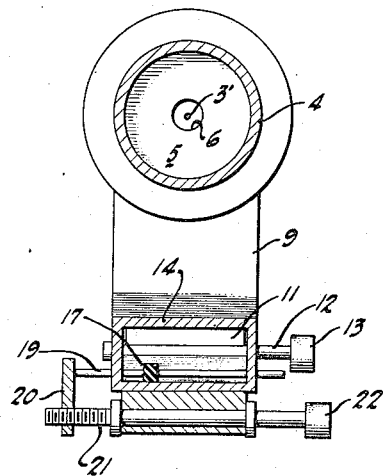
FIG-2
INVENTOR.
ROBERT L. KYHL
BY Lippincott and Smith
ATTORNEYS United States Patent Office 2,830,268
Patented Apr. 8, 1958

2,830,268

METHOD FOR MEASURING BEAM CURRENT

Robert L. Kyhl, Albany, N. Y., assignor to The Board of Trustees of the Leland Stanford, Jr., University, Stanford University, Stanford, Calif.

Application April 29, 1955, Serial No. 504,858

2 Claims. (Cl. 324—95)

This invention relates to an improved apparatus and method for measuring electric currents in beams of electrons or other charged particles, and in particular for measuring the current in a beam of high-velocity bunched electrons provided by an electron accelerator.

In the operation of electron accelerators and the like which provide beams of bunched high-energy charged particles, it is often desirable to provide means for continuously monitoring or measuring the beam current. When a beam of bunched charged particles passes through a resonant cavity, there are produced in the cavity electromagnetic waves having an energy value which is related to beam current values and to the shunt impedance of the cavity. It has been common practice heretofore to measure the electromagnetic energy produced in this manner as a means for determining the beam current. However, small beam currents may not produce sufficient electromagnetic energy in the cavity for convenient measurement. More sensitive apparatus for measuring small beam currents heretofore has, for example, comprised an ionization chamber inserted into the beam or an electrode inserted into the beam for collecting all or a part of the beam current. Although sensitive measurements can be obtained in this way, passage of the beam through an ionization chamber or collection of the beam for measurement purposes may interfere with a desired utilization of the beam. Accordingly, a principal object of the present invention is to provide a more sensitive method and apparatus for measuring beam currents without collecting or otherwise interrupting the beam. Other objects and advantages will appear as the description proceeds.

Briefly stated, in accordance with one aspect of the invention, the beam of bunched electrons or other charged particles passes through an array of cavities coupled in series, and produces therein an electromagnetic wave which travels along the array from the first in order to the last in order of these cavities. Electromagnetic energy is extracted from the last cavity and is divided into two portions. One portion of the extracted energy is fed back to the first cavity through a positive feedback circuit, so that the amount of electromagnetic energy in the cavities is greatly increased. The other portion of the extracted energy is measured to determine the beam current. In this way, smaller beam currents can be measured than was possible heretofore without intercepting or collecting a portion of the beam.

The invention will be better understood from the following description taken in connection with the accompanying drawing, and its scope will be pointed out in the appended claims.

In the drawing:

Fig. 1 is a schematic plan view, partly in longitudinal section, showing apparatus embodying the invention; and Fig. 2 is a transverse section taken generally along the line 2—2 of Fig. 1.

Referring now to the drawing, an electron buncher and accelerator 1 supplies a beam of bunched high-energy electrons to an electron receiver 2. The electron buncher and accelerator 1 may be a conventional linear accelerator or other apparatus providing a beam of bunched charged particles. The electron receiver 2 may be any apparatus for utilizing such a beam, such as an evacuated chamber containing a sample of material which it is desired to bombard with the charged particles. Alternatively, receiver 2 may include additional accelerator apparatus for further increasing the energy of the beam.

The beam of bunched charged particles, indicated in the drawing by a broken line at 3 and 3', passes along the longitudinal axis of an evacuated hollow cylindrical wave guide 4, or other wave-transmission structure comprising a plurality of cavities or interaction regions, connected between accelerator 1 and receiver 2 as shown. Wave guide 4 has a plurality of disc-shaped transverse interior partitions 5 equally spaced along the wave guide axis to form a linear array of cylindrical cavities. Partitions 5 have central apertures 6 alined along the wave guide axis to provide a passage for the electron beam and to couple the cavities in series. The beam of bunched electrons passes through the cavities successively and produces electromagnetic waves within the cavities which travel from left to right along the wave guide from the first in order to the last in order of the cavities defined by wave guide 4 and partitions 5. A matched coupler 7 is connected to the left hand end of wave guide 4, as shown, for supplying electromagnetic energy to the first cavity in a manner hereinafter explained. A matched coupler 8 is connected to the right hand end of wave guide 4 for extracting electromagnetic energy from the last cavity. Wave guide 4 and partitions 5, constituting a disc-loaded wave guide, are designed and dimensioned so that electromagnetic waves transmitted thereby have a phase velocity substantially equal to the linear velocity of charged particles in the beam. Thus the wave guide design is similar to that used in a conventional linear accelerator and follows principles well known to those skilled in the art.

Coupler 8 is connected through a short wave guide section 9 to a power divider 10 which divides the extracted electromagnetic energy into two portions. Power divider 10 may, if desired, be an adjustable ratio type such as, for example, an adjustable ratio type having a thin electrically-conductive plate 11 pivotably supported by a shaft 12. The upper end of plate 11 may be moved toward the left or toward the right, selectively, by turning adjusting knob 13, for example, to adjust the ratio of power division. Such power dividers are described in detail in the book "Microwave Transmission Circuits" by George L. Ragan, 1st ed., McGraw-Hill Book Co., 1948, vol. 9 of the MIT Radiation Laboratory Series, pages 522–524.

A wave guide feedback circuit 14 is connected between power divider 10 and coupler 7 as shown, and transmits the first divided portion of the extracted electromagnetic energy back to the first cavity of wave guide 4 in proper phase relation for positive feedback, so that the microwave energy within the cavities is increased by the continuous recirculation of energy from the right hand end of wave guide 4 through feedback circuit 14 to the left hand end of wave guide 4, and repetitive interaction between the waves and the beam. The second divided portion of the extracted electromagnetic energy is transmitted to a power detector 15 which is connected to power divider 10 by a short length of wave guide 16, as shown. The power detector 15 may be any suitable device for measuring microwave energy. Many such power detectors are known to those skilled in the art, and a number are described in chapter 3, pages 79–220 of the book, "Technique of Microwave Measurements," by Carold G. Montgomery, McGraw-Hill Book Co., 1947, vol. 11 of the MIT Radiation Laboratory Series.

To obtain the largest amount of positive feedback, and hence the greatest sensitivity of the measurement system, the electromagnetic waves returned to wave guide 4 through feedback circuit 14 must be exactly in phase with the electromagnetic waves produced directly in wave guide 4 by the bunched electron beam. This desirable phase relation can be obtained simply by choosing an appropriate length for feedback wave guide 14 in the design and construction of the apparatus. However, to allow for inaccuracies in construction, changes of electrical characteristics of the wave guide due to thermal expansion and the like, and possible variations in the operating frequency of the system, an adjustable phase shifter is preferably provided in the feedback circuit. The phase shifter may comprise a slab 17 of dielectric material, preferably polystyrene, oriented longitudinally in wave guide 14 and adjustable in position from the center to one side of the wave guide. Slab 17 is connected to transverse rods 18 and 19 which extend through holes in the sides of the wave guide and are connected to a plate 20, the position of which is controlled by a screw 21 connected to an adjusting knob 22. When knob 22 is turned, the lateral position of slab 17 within the wave guide is adjusted. As is known to those skilled in the art, changes in the lateral position of slab 17 change the amount of phase shift produced by the phase shifter, and thus adjust the phase of electromagnetic waves supplied through feedback wave guide 14 to coupler 7. Phase shifters of this type are described in more detail in the book, "Microwave Transmission Circuits," supra, pages 514–516. Alternatively, other types of phase shifting apparatus may be used if desired.

The measurement system described is much more sensitive to small beam currents than single cavity systems heretofore used. By using a plurality of cavities connected in series the effective shunt impedance of the circuit is increased with a consequent gain in sensitivity. Furthermore, the positive feedback provided through feedback circuit 14 produces a stronger electric field in each of the cavities, so that more energy is extracted from the beam during its passage through each cavity. In general, as a greater proportion of the extracted energy is fed back through circuit 14, by moving plate 11 toward the right, the electric field in the cavities becomes stronger and more energy is extracted from the beam. However, at the same time circuit losses are increased, so that a best adjustment of plate 11 will be found at which the largest amount of electromagnetic energy is supplied to power detector 15. In general, actual experiment provides the easiest way to find this best adjustment. The apparatus is put into operation with an electron beam supplied by accelerator 1, and knobs 13 and 22 are adjusted experimentally to provide the largest power reading at power detector 15. Any changes in the beam current will then produce corresponding changes in the reading provided by the power detector so that relative values of the beam current are easily obtained without any further calibration. In many applications such relative readings are all that is required.

When absolute values of the beam current are required the apparatus should first be calibrated—for example, by replacing electron receiver 2 with an electrode for collecting the beam current, and measuring the collected current by means previously known to those skilled in the art. Readings of power detector 15 can thus be calibrated in terms of absolute values of beam current. The collector electrode is then replaced by the receiver 2, and the beam may be utilized in any desired manner while values of beam current are indicated by detector 15. In general, a particular calibration is accurate only for a beam which is steady and not fluctuating except for the bunching, for a single fundamental frequency determined by the time interval between bunches, and for a single shape of current pulse in each bunch. If the beam changes in any of these respects the apparatus should be recalibrated.

It will be understood that this invention is not limited to specific embodiments herein illustrated and described, and that the following claims are intended to cover all changes and modifications which do not depart from the true spirit and scope of the invention.

What is claimed is:

1. The method of measuring current in a beam of bunched charged particles, which comprises the steps of directing said beam of bunched particles into the electric field of a traveling electromagnetic wave generated as a function of the beam current so that said beam interacts with and transfers energy to said wave, dividing the energy of said wave after interaction with said beam into two portions, feeding one of said two portions back to increase said electromagnetic wave and interact repetitively with said beam, and measuring the second of said two portions.

2. The method of measuring current in a beam of periodically bunched charged particles which comprises the steps of directing said beam of bunched particles through a structure that transmits electromagnetic waves with a phase velocity substantially equal to the particle velocity of said beam, whereby electromagnetic waves are produced in and travel from a first end to a second end of said structure, extracting electromagnetic energy from said second end, dividing said extracted energy into first and second portions, supplying said first portion to said first end for providing positive feedback to increase the traveling electromagnetic waves in such structure, and measuring the magnitude of said second portion.

References Cited in the file of this patent

UNITED STATES PATENTS

| | | |
|---|---|---|
| 2,653,270 | Kompfner | Sept. 22, 1953 |
| 2,724,775 | Field | Nov. 22, 1955 |